United States Patent
Campbell (10) Patent No.: US 11,143,752 B2
(45) Date of Patent: Oct. 12, 2021

(54) METHOD FOR DETECTING POSITION ERROR IN REMOTE SENSORS WITH GEOMETRIC CONSTRAINTS

(71) Applicant: GM GLOBAL TECHNOLOGY OPERATIONS LLC, Detroit, MI (US)

(72) Inventor: Charles A. Campbell, Commerce Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 253 days.

(21) Appl. No.: 16/535,898

(22) Filed: Aug. 8, 2019

(65) Prior Publication Data

US 2021/0041546 A1  Feb. 11, 2021

(51) Int. Cl.
*H02J 7/00*  (2006.01)
*G01S 11/06*  (2006.01)
*B60L 3/00*  (2019.01)

(52) U.S. Cl.
CPC ............ *G01S 11/06* (2013.01); *B60L 3/0038* (2013.01)

(58) Field of Classification Search
CPC .... G01S 11/06; B60L 3/0038; H01M 10/488; H01M 6/505; H04W 64/00
See application file for complete search history.

(56) References Cited

U.S. PATENT DOCUMENTS

| | | | | |
|---|---|---|---|---|
| 3,622,396 A | * | 11/1971 | Fernandez | H01M 10/488 29/623.1 |
| 8,704,485 B1 | * | 4/2014 | Tsukamoto | B60L 50/66 320/112 |
| 9,950,577 B1 | * | 4/2018 | Marlett | B60C 23/0437 |
| 2005/0131605 A1 | * | 6/2005 | Nakamoto | B60N 2/002 701/45 |
| 2006/0220815 A1 | * | 10/2006 | Thomas | B60C 23/0416 340/447 |
| 2007/0184852 A1 | * | 8/2007 | Johnson | H04W 64/00 455/456.1 |
| 2011/0074569 A1 | * | 3/2011 | Alsindi | G01S 5/0289 340/539.1 |
| 2016/0031417 A1 | * | 2/2016 | Kornek | G01S 7/295 701/2 |
| 2018/0276913 A1 | * | 9/2018 | Garcia | H04L 12/40 |

(Continued)

FOREIGN PATENT DOCUMENTS

WO  WO-2014015746 A1  1/2014

*Primary Examiner* — Munear T Akki
(74) *Attorney, Agent, or Firm* — Harness, Dickey & Pierce, P.L.C.

(57) ABSTRACT

A system in a vehicle for detecting misconfigured sensors. The system comprises a plurality of remote sensor modules, each of the remote sensor modules having a known location within a geometrically constrained area of the vehicle, each of the remote sensor modules comprising a wireless transceiver. The system also includes a manager module comprising a wireless transceiver for communicating wirelessly with each of the remote sensor modules. The manager module directs each of the plurality of remote sensor modules to determine a radio frequency (RF) measurement value associated with each of the other remote sensor modules and to report the RF measurement values back to the manager module. The manager module uses the reported RF measurement values to identify an out-of-position remote sensor module.

20 Claims, 4 Drawing Sheets

(56) References Cited

U.S. PATENT DOCUMENTS

| | | | |
|---|---|---|---|
| 2019/0003877 A1* | 1/2019 | Aina | B60R 21/01516 |
| 2019/0222652 A1* | 7/2019 | Graefe | H04W 4/40 |
| 2019/0242949 A1* | 8/2019 | Lemkin | H01M 10/42 |

* cited by examiner

METHOD FOR DETECTING POSITION ERROR IN REMOTE SENSORS WITH GEOMETRIC CONSTRAINTS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to wireless remote sensors in vehicles and to a method and an apparatus for detecting a position error of a remote sensor in a vehicle. Newer vehicles make extensive use of wireless sensors for a variety of purposes. A chief benefit of using such wireless devices is the reduction in weight and costs associated with the wiring harnesses found in conventional vehicles.

However, it is possible for wireless sensors to be installed incorrectly in a vehicle, which causes problems during both manufacturing and service. It is often difficult if not impossible to determine the location of a sensor within a vehicle or vehicle component.

In situations where vehicles are close together, either in a service shop or an assembly line, a wireless base station in one vehicle may mistakenly communicate with a wireless remote sensor in another vehicle. It is possible to use a received signal strength indicator (RSSI) measurement to determine the distance to a given remote sensor on a 1:1 basis. However, this proves unreliable due to the variance of the RSSI measurement caused by the internal structures of the vehicle that may diminish a signal.

Therefore, there is a need for apparatuses and methods for detecting and identifying wireless remote sensors in a vehicle that are misaligned or installed in the wrong location.

SUMMARY

It is an object of the present disclosure to provide a system in a vehicle comprising: i) a plurality of remote sensor modules, each of the remote sensor modules having a known location within a geometrically constrained area of the vehicle, each of the remote sensor modules comprising a wireless transceiver; and ii) a manager module comprising a wireless transceiver configured to communicate wirelessly with each of the plurality of remote sensor modules. The manager module is configured to direct each of the plurality of remote sensor modules to determine a radio frequency (RF) measurement value associated with each of the other remote sensor modules and to report the RF measurement values back to the manager module. The manager module is configured to use the reported RF measurement values to identify an out-of-position remote sensor module.

In one embodiment, the manager module is configured to generate an initial calibrated distance matrix based on the known locations of the plurality of remote sensors in the geometrically constrained area of the vehicle.

In another embodiment, the manager module generates a measured distance matrix using the reported RF measurement values.

In still another embodiment, the manager module uses differences between the calibrated distance matrix and the measured distance matrix to identify the out-of-position remote sensor module.

In yet another embodiment, the manager module calculates mean squared error values between the calibrated distance matrix and the measured distance matrix.

In a further embodiment, the manager module uses the mean squared error values to identify the out-of-position remote sensor module.

In a still further embodiment, the system is associated with a battery pack of the vehicle.

In a yet further embodiment, the battery pack comprises a plurality of battery sections, each of the plurality of battery sections comprising a plurality of battery cells.

In one embodiment, each of the plurality of remote sensor modules is associated with a selected one of the battery sections.

In another embodiment, each of the plurality of remote sensor modules measures the status of the plurality of battery cells in the associated selected one of the battery sections.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The present disclosure describes a system of wireless remote sensors forming a mesh network that is used to create and to configure a matrix of measured signal values (e.g., RSSI values) between each of the wireless remote sensors and a base station (i.e., a management module). The system uses the matrix of measured values to validate any given configuration of the mesh network, with known geometric constraints as a baseline for generating an error metric. The error metric enables the system to determine is a sensor is misplaced or misconfigured, even in the present of noise in the sampled RSSI values.

In an exemplary embodiment having geometric constraints, the present disclosure describes an electric vehicle powered by a battery pack. The battery pack comprises a plurality of sections, where each section may have, for example, up to 12 cells, and a wireless sensor module that transmits wirelessly to a manager module that is also in the pack or on a controller board. The manager module functions as a base station with respect to the wireless sensors in the plurality of sections. The manager module may communicate over a wired serial bus to a battery controller module.

The present disclosure describes an apparatus and method for detecting classes of errors caused by moving or swapping the positions of remote sensor modules or by connecting to incorrect but nearby sensors (e.g., sensor(s) within another vehicle). The disclosed apparatus and method use known geometric constraints and a position estimate derived from the sampled RSSI values of all sensors modules in the system relative to the interrogating sensor module. The RSSI values of all other sensor modules seen by each sensor module are compiled into a table in the manager module.

The RSSI values of a connected device have been used to provide a very rough estimate of position. However, the conventional application usually has two sensors in unknown orientations in unknown locations and is not reliable enough on a one-to-one basis to determine the distance to a sensor module. The present disclosure describes using aspects unique to an in-vehicle environment—in particular a known position for each of the sensor modules in a geometric constraints matrix, a relatively high number of sensor modules, and a sampled RSSI matrix—to determine the mean squared error of the position of a given sensor in the system. The disclosed method can detect errors in which, for example, two sensor modules are swapped, a sensor module is outside of the vehicle, a sensor module has a failing antenna, or the like, by determining from every other sensor module the RF signal measurements of a given sensor module.

Figure 1:
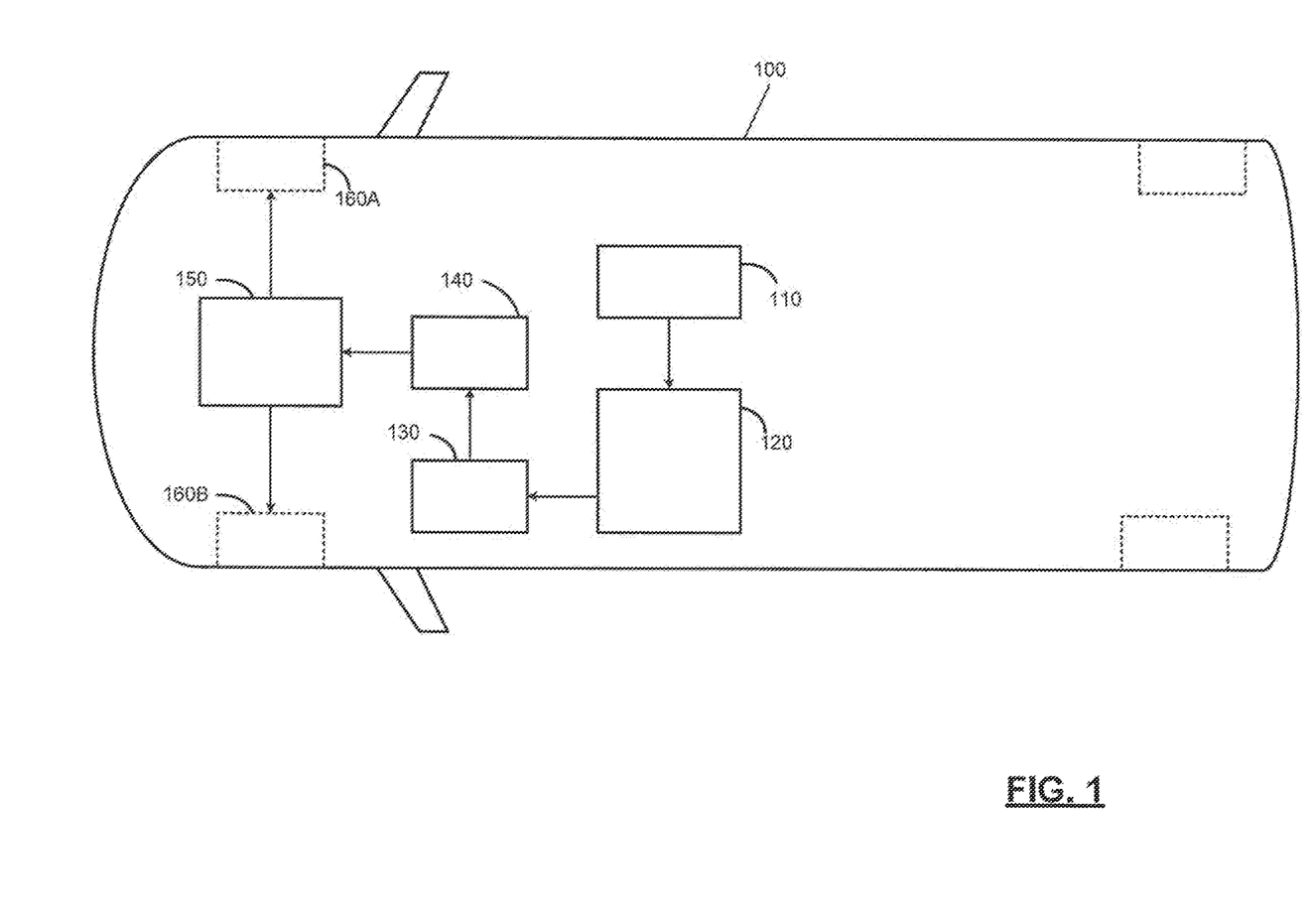
FIG. 1 is a high-level diagram of an electric vehicle according to an embodiment of the disclosure.

FIG. 1 is a high-level diagram of electric vehicle 100 according to an embodiment of the disclosure. Electric vehicle 100 comprises battery controller module 110, battery pack 120, power converter 130, electric motor 140, transmission 150, and wheels 160A and 160B. In an exemplary embodiment, battery controller module 110 controls the charging of a plurality of battery cells in battery pack 120 and is configured to wirelessly communicate with remote sensor modules disposed in battery pack 120 in order to monitor the status of the battery cells.

Power converter 130 receive DC power output from battery pack 120 and converts the DC power to an AC output voltage that is applied to electric motor 120. The output torque of electric motor 140 is applied to transmission 150, which turns wheels 160A and 160B. In one embodiment, transmission 150 may be, for example, a single gear transmission. The speed and acceleration of vehicle 100 is controlled by the level of AC output voltage from power converter 130. The AC output voltage of power converter 130 is, in turn, controlled by the accelerator pedal (not shown) in vehicle 100.

Figure 2:
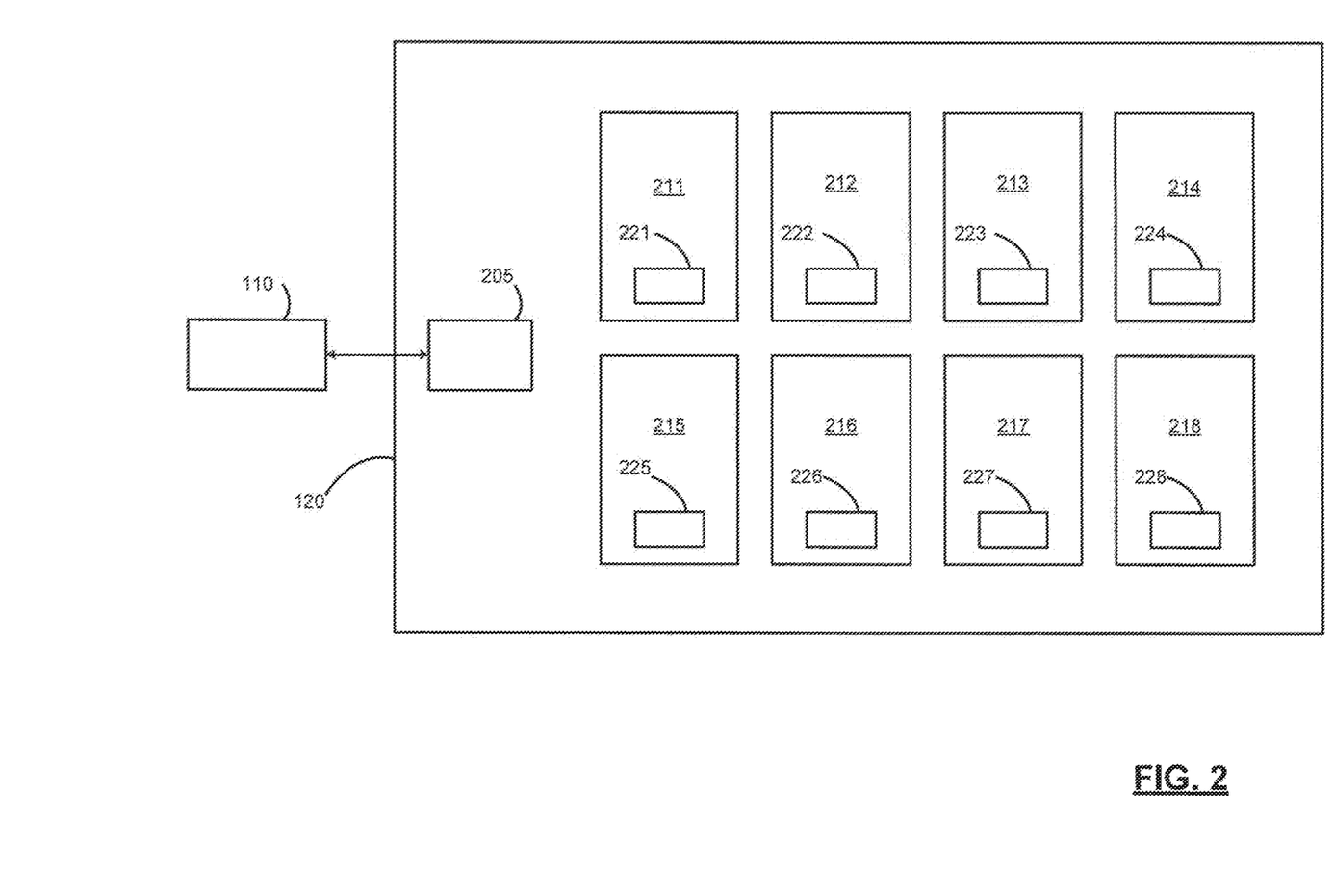
FIG. 2 is a more detailed diagram of a multicell battery pack in the vehicle of FIG. 1 according to an embodiment of the disclosure.

FIG. 2 is a more detailed diagram of multicell battery pack 120 in vehicle 100 of FIG. 1 according to an embodiment of the disclosure. Battery pack 120 comprises battery manager module 205 and a plurality of battery sections 211-218. In the exemplary embodiment, battery pack 120 comprises eight (8) battery sections. However, this is by way of example only and should not be construed to limit the scope of this disclosure or the claims herein. In other embodiments, battery pack 120 may comprise more than eight or less than eight battery sections. Also, in other embodiments, battery pack 120 may comprise more than one battery manager module 205.

Each one of battery sections 211-218 comprises a plurality of battery cells (not shown) and a corresponding one of remote sensor (RS) modules 221-228. Each one of RS modules 221-228 comprises a wireless transceiver (e.g., a Bluetooth transceiver) and monitoring circuitry that monitors the status of each of the plurality of cells in each section. Each RS module (or controller) 221-228 may also comprise, for example, a processor, a memory that stores executable code, and corresponding peripherals and interface circuitry, which may be implemented in, for example, a field programmable gate array (FPGA). In an exemplary embodiment, all of the components of each RS module 221-228 may be implemented as a system-on-a-chip (SoC) device.

By way of example, remote sensor (RS) module 221 monitors the status of a plurality of battery cells (not shown) in battery section 211. The status may include, for example, the voltage level and current output of each battery cell. Similarly, RS module 222 monitors the status of a plurality of battery cells in battery section 212, RS module 223 monitors the status of a plurality of battery cells in battery section 213, and so forth. Each RS module 221-228 is configured to wirelessly transmit the status information for the battery cells in each corresponding battery section 211-218 to battery manager module 205. Thus, battery manager module 205 acts as a base station in battery pack 120. Battery manager module 205 reports the battery cell status information to battery controller 110 by mean of, for example, a serial wireline connection.

Each of the RS modules 221-228 is further configured to communicate wirelessly with each of the other RS modules 221-228 and to determine a received signal strength indicator (RSSI) value for each of the other RS modules 221-228. An RSSI value is an estimated measure of the power level that each wireless transceiver is receiving from each of the other RS modules and from battery manager module 205. At longer distances, the RSSI value gets weaker. According to the principles of the present disclosure, each of the RS modules 221-228 builds a table of the RSSI values for the other RS modules 221-228 and transmits the RSSI table to battery manager module 205. Battery manager module 205 uses the RSSI tables from all of the RS modules 221-228 to detect and identify out-of-place RS modules.

For example, RS module 221 measures the RSSI values of each of RS modules 222-228, creates a first RSSI table containing the measured RSSI values for RS modules 222-228, and transmits the first RSSI table to battery manager module 205. Similarly, RS module 222 measures the RSSI values of each of RS modules 221 and 223-228, creates a second RSSI table containing the measured RSSI values for RS modules 221 and 223-228, and transmits the second RSSI table to battery manager module 205. This process continues for each of RS modules 223-228 until battery manager module 205 receives a total of eight (8) RSSI tables. In embodiments where battery pack 120 comprises more than one battery manager module 205, the process is repeated for all battery manager modules 205.

Figure 3:
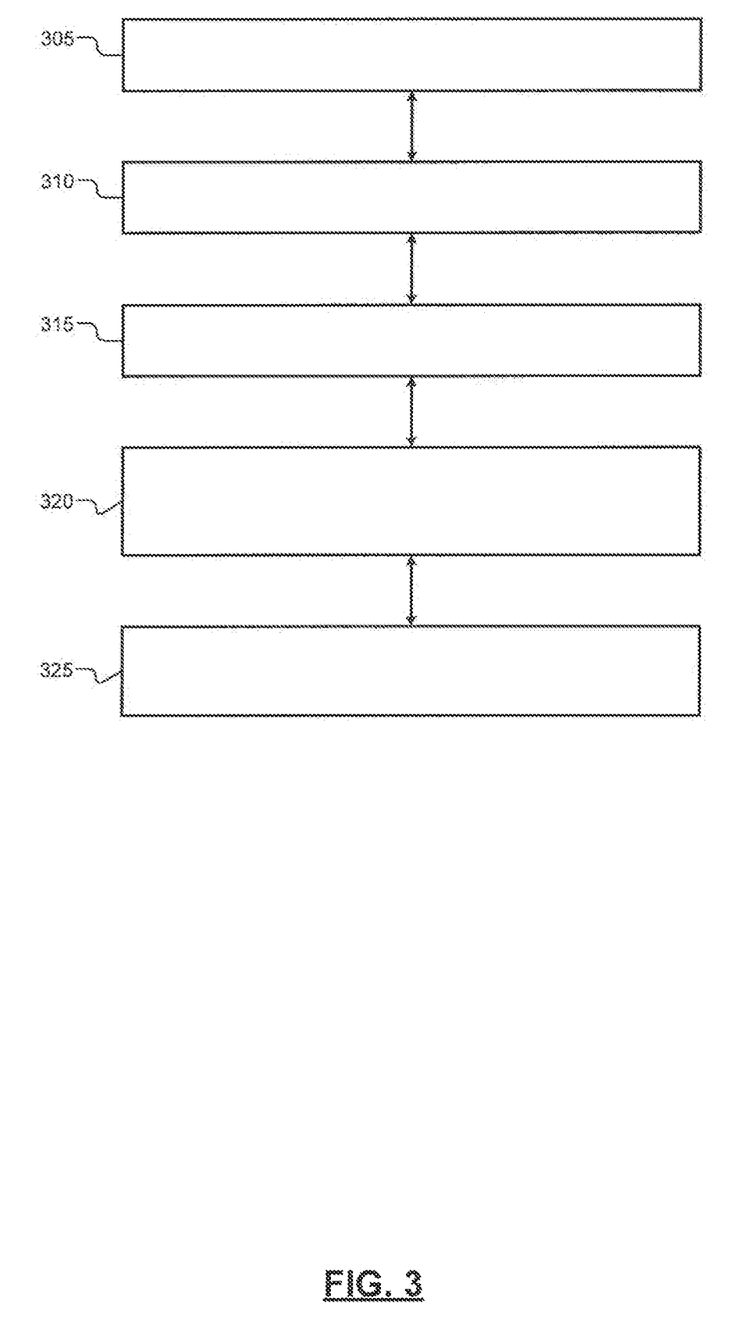
FIG. 3 is a flow diagram illustrating a method of detecting an out-of-position remote sensor in the battery pack according to an embodiment of the invention.

FIG. 3 is a flow diagram illustrating a method of detecting an out-of-position remote sensor in battery pack 120 according to an embodiment of the invention. Advantageously, the nonhomogeneous or asymmetric RF environment in a vehicle, whether intentional or unintentional, can fingerprint a particular vehicle or battery pack. The disclosed method generate an error metric to determine out-of-order, swapped, or misconfigured remote sensor module using: i) a matrix of known distances between each sensor to use as a baseline; ii) a sampled power reading matrix between each remote sensor; and iii) intrinsic parameters, including the regression of RSSI against distance for each remote sensor module.

The disclosed method may use as an input algorithm the standard distance equation for RF measured power, namely:

$$Distance = 10^{\frac{MeasuredPower - RSSI}{10*N}},$$

where MeasuredPower is the RSSI value at 1 meter and N is the regression constant for distance against RSSI, as the distance increases.

Initially, in 305, battery manager module 205 calibrates the system with a "correct" distance matrix, wherein the position of each remote sensor with respect to each of the other remote sensors is known. Furthermore, the position of each remote sensor with respect to each base station (i.e., battery manager module 205) also is known for vehicle 100.

In 310, battery manager module 205 directs each one of RS modules 221-228 to measure the RSSI value to each of the other remote sensor and to each battery manager module 205. In 315, each of RS modules 221-228 reports the measured RSSI values to battery manager module 205, which creates and stores a Sampled RSSI Matrix. In 320, battery manager module 205 uses the sampled RSSI Matrix along with the calibrated Standard Distance equation to estimate the measured distance between each sensor based on the RF information. In 325, battery manager module 205 uses that distance matrix and calculates the mean squared error between the calibrated distance matrix and the measured distance matrix.

The sum of the MSE for each one of RS modules 221-228 gives a metric that determines how likely a particular one of RS modules 221-228 is in the correct position. Steps, 310, 315, 320, and 325 are periodically repeated under the control of battery manager module 205 in order to detect an out-of-position remote sensor module. Advantageously, even without calibrating the absolute or previously seen MSE, battery manager module 205 may use the mode of the maximum MSE to determine whether a sensor has a positioning issue. This makes the system robust to changes due to noise. In addition, if the system electrical environment is nonhomogeneous, in a way that is asymmetric, then that asymmetric nature can also affect the sampled RSSI and could allow error detection in cases where the sections are otherwise equidistant. In a situation where, for example, two remote sensors are both detected in an error state, remedial actions may include remapping those remote sensors to fix the problem without technician intervention. That information is available in the error metric and may be used to resolve the issue without hardware intervention.

Figure 4:
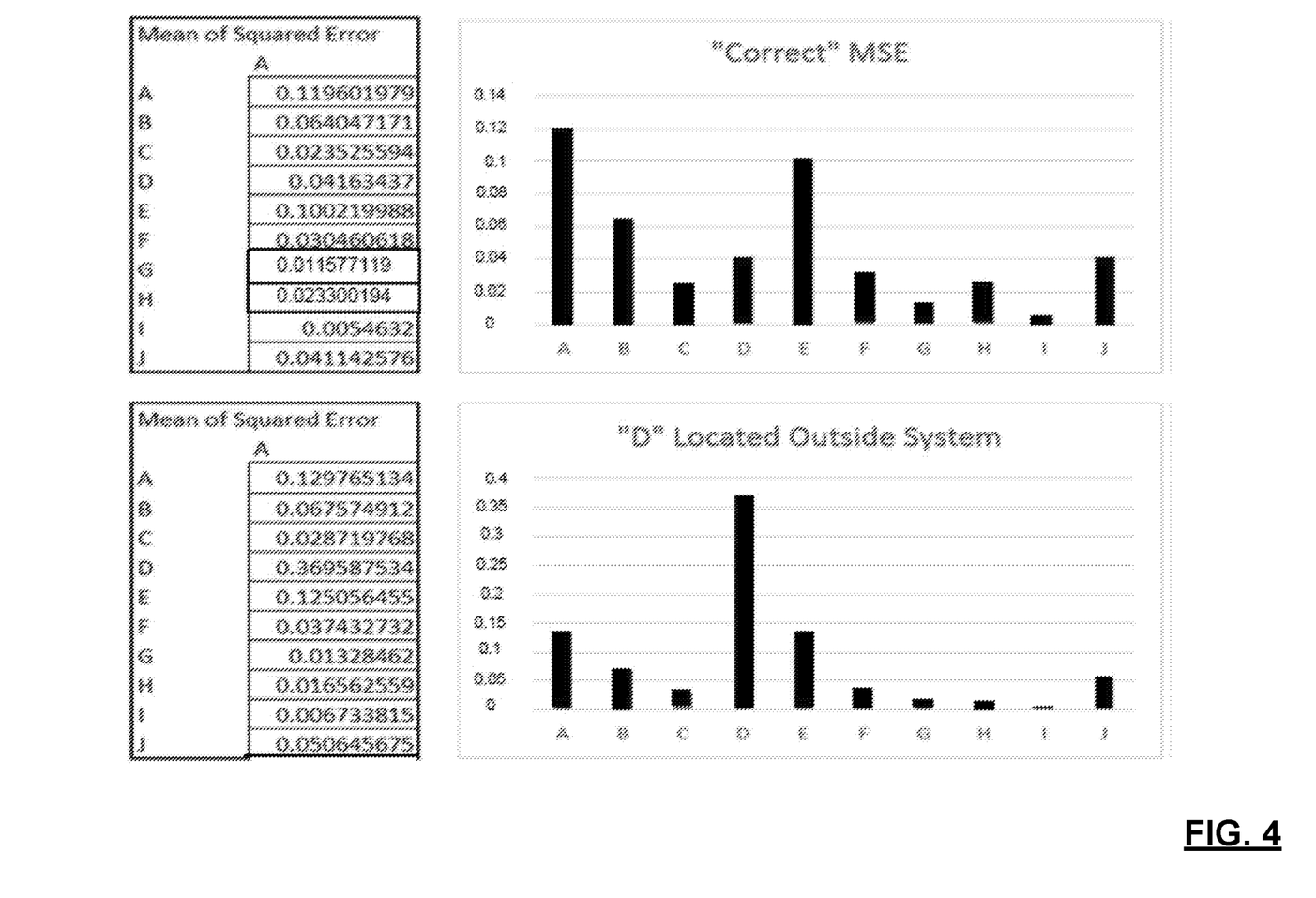
FIG. 4 illustrates a table of correct MSE values for properly positioned remote sensors and a table of MSE values when a remote sensor is out of position.

FIG. 4 illustrates a table of correct MSE values for properly positioned remoted sensors and a table of MSE values when a remote sensor is out of position. The top table ("Correct MSE") contains the values associated with the initially calibrated system when all remote sensor modules (identified as A through J) are in the correct position. Subsequently, during manufacturing or during service, the top table of values is determined. These values indicate that sensor D is either out-of-place or a remote sensor from a nearby vehicle has been detected.

The MSE is also a simple means of deriving an error metric. Alternatively, a Kalman filter or particle filter applied to the geometric baseline and the sampled RSSI matrix may be a more sophisticated method. The disclosed system may use the measured strength to determine installation errors during both vehicle manufacturing and periodic service appointments. Advantageously, deriving an error metric using all remote sensors in the mesh network instead of just the base station is advantageous since normal networks have a fixed base station with "floating" mesh elements. In the disclosed system, multiple base stations (battery manager modules) may be used. This is a unique configuration, which due to the nature of the error metric, dramatically improves the number of misconfigured remote sensor states that can be detected.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system for detecting position error in remote sensors in a vehicle comprising:
a plurality of remote sensor modules, each of the remote sensor modules having a predetermined location within a geometrically constrained area of the vehicle, each of the remote sensor modules comprising a wireless transceiver; and a manager module comprising a wireless transceiver configured to communicate wirelessly with each of the plurality of remote sensor modules, wherein the manager module is configured to direct each of the plurality of remote sensor modules to determine a radio frequency (RF) measurement value associated with each of the other remote sensor modules and to report the RF measurement values back to the manager module, wherein the manager module is configured to use the reported RF measurement values to identify an out-of-position remote sensor module.

2. The system of claim 1, wherein the manager module is configured to generate an initial calibrated distance matrix based on the predetermined locations of the plurality of remote sensors in the geometrically constrained area of the vehicle.

3. The system of claim 2, wherein the manager module generates a measured distance matrix using the reported RF measurement values.

4. The system of claim 3, wherein the manager module uses differences between the calibrated distance matrix and the measured distance matrix to identify the out-of-position remote sensor module.

5. The system of claim 3, wherein the manager module calculates mean squared error values between the calibrated distance matrix and the measured distance matrix.

6. The system of claim 5, wherein the manager module uses the mean squared error values to identify the out-of-position remote sensor module.

7. The system of claim 4, wherein the system is associated with a battery pack of the vehicle.

8. The system of claim 7, wherein the battery pack comprises a plurality of battery sections, each of the plurality of battery sections comprising a plurality of battery cells.

9. The system of claim 8, wherein each of the plurality of remote sensor modules is associated with a selected one of the battery sections.

10. The system of claim 9, wherein each of the plurality of remote sensor modules measures a status of the plurality of battery cells in the associated selected one of the battery sections.

11. A method for detecting position error in remote sensors in a vehicle for detecting misconfigured sensors comprising: in each of a plurality of remote sensor modules, each of the remote sensor modules having a predetermined location within a geometrically constrained area of the vehicle, communicating wirelessly with a manager module; in the manager module, directing each of the plurality of remote sensor modules to determine a radio frequency (RF) measurement value associated with each of the other remote sensor modules; in each of the remote sensor modules, determining the RF measurement value associated with each of the other remote sensor modules and reporting the RF measurement values back to the manager module; and in the manager module; using the reported RF measurement values to identify an out-of-position remote sensor module.

12. The method of claim 11, further comprising:
in the manager module, generating an initial calibrated distance matrix based on the predetermined locations of the plurality of remote sensors in the geometrically constrained area of the vehicle.

13. The method of claim 12, further comprising:
in the manager module, generating a measured distance matrix using the reported RF measurement values.

14. The method of claim 13, further comprising:
in the manager module, using differences between the calibrated distance matrix and the measured distance matrix to identify the out-of-position remote sensor module.

15. The method of claim 13, further comprising:
in the manager module, calculating mean squared error values between the calibrated distance matrix and the measured distance matrix.

16. The method of claim 15, further comprising:
in the manager module, using the mean squared error values to identify the out-of-position remote sensor module.

17. The method of claim 14, wherein the plurality of remote sensor modules and the manager module are associated with a battery pack of the vehicle.

18. The method of claim 17, wherein the battery pack comprises a plurality of battery sections, each of the plurality of battery sections comprising a plurality of battery cells.

19. The method of claim 18, wherein each of the plurality of remote sensor modules is associated with a selected one of the battery sections.

20. The method of claim 19, wherein each of the plurality of remote sensor modules measures a status of the plurality of battery cells in the associated selected one of the battery sections.

* * * * *